(12) United States Patent
Cunningham et al.

(10) Patent No.: US 9,260,091 B2
(45) Date of Patent: Feb. 16, 2016

(54) METHOD AND SYSTEM FOR REDUCING VACUUM CONSUMPTION IN A VEHICLE

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 133 days.

(21) Appl. No.: 13/943,189

(22) Filed: Jul. 16, 2013

(65) Prior Publication Data

US 2015/0021140 A1 Jan. 22, 2015

(51) Int. Cl.
| | |
|---|---|
| B60W 10/18 | (2012.01) |
| B60T 13/52 | (2006.01) |
| B60T 8/32 | (2006.01) |
| B60T 8/17 | (2006.01) |
| B60T 13/565 | (2006.01) |
| B60T 13/72 | (2006.01) |
| B60T 13/46 | (2006.01) |
| B60T 17/02 | (2006.01) |

(52) U.S. Cl.
CPC ... *B60T 8/17* (2013.01); *B60T 8/32* (2013.01); *B60T 13/46* (2013.01); *B60T 13/565* (2013.01); *B60T 13/72* (2013.01); *B60T 17/02* (2013.01); *B60W 10/18* (2013.01); *Y10T 477/813* (2015.01)

(58) Field of Classification Search
None
See application file for complete search history.

(56) References Cited

U.S. PATENT DOCUMENTS

| | | | | | |
|---|---|---|---|---|---|
| 5,984,429 | A | * | 11/1999 | Nell et al. | 303/113.4 |
| 7,125,085 | B2 | * | 10/2006 | Ohsaki et al. | 303/119.1 |
| 7,152,933 | B2 | | 12/2006 | Collins et al. | |
| 7,475,951 | B2 | | 1/2009 | Ichikawa | |
| 2009/0326773 | A1 | * | 12/2009 | Cress et al. | 701/70 |
| 2011/0006591 | A1 | * | 1/2011 | Yoshii et al. | 303/4 |
| 2011/0136625 | A1 | * | 6/2011 | Yu et al. | 477/185 |
| 2011/0178687 | A1 | | 7/2011 | Anderson et al. | |
| 2012/0200147 | A1 | * | 8/2012 | Endo et al. | 303/3 |
| 2013/0060442 | A1 | | 3/2013 | Kaster et al. | |

OTHER PUBLICATIONS

Cunningham, Ralph Wayne et al., "Method and System for Reducing Vacuum Use in a Vehicle," U.S. Appl. No. 13/943,431, filed Jul. 16, 2013, 37 pages.

* cited by examiner

Primary Examiner — Ramya Burgess
Assistant Examiner — Mark Manley
(74) *Attorney, Agent, or Firm* — Julia Voutyras; Alleman Hall McCoy Russell & Tuttle LLP

(57) ABSTRACT

A system and method for conserving vacuum within a vehicle is described. In one example, vacuum is conserved via limiting volume expansion of a brake booster working chamber.

7 Claims, 4 Drawing Sheets

METHOD AND SYSTEM FOR REDUCING VACUUM CONSUMPTION IN A VEHICLE

BACKGROUND/SUMMARY

Vacuum may be used in a vehicle to apply motive force in vehicle systems. For example, vacuum may be used to apply vehicle brakes, operate a turbocharger waste gate, and adjust valve positions in heating and ventilation ducts. However, vacuum in vehicle systems is becoming a less available resource due to the trend of engine downsizing and variable valve timing to improve vehicle fuel economy.

One of the more significant consumers of vacuum in a vehicle is the vehicle brake system. Vacuum is used in a brake booster to apply brakes. In particular, vacuum is applied to both sides of a brake booster diaphragm when brakes are not applied. Pressure equalization across the diaphragm allows the diaphragm to return to a position where a piston in the master cylinder does not increase brake line pressure. When the brakes are applied, vacuum on a working side of the diaphragm is displaced with ambient air while vacuum remains present on the vacuum side of the diaphragm. Consequently, a pressure differential is produced across the diaphragm that motivates the diaphragm to apply force to the piston in the master cylinder, thereby increasing brake pressure and applying the brakes.

During vehicle braking, a driver receives visual and physical cues that allow the driver to know whether or not a proper amount of force is being applied to the brake pedal to provide the desired braking amount or level. However, when the vehicle is stopped, the driver receives much less information regarding whether or not braking force is adequate or more than is desired to keep the vehicle from moving. Consequently, the driver may apply more brake force than is desired to keep the vehicle from moving. As a result, more vacuum than is desired may be consumed when the vehicle is stopped.

The inventors herein have recognized the above-mentioned disadvantages and have developed a method for conserving vacuum, comprising: limiting a brake line pressure increase at a wheel brake in response to an increasing in brake pedal force when a vehicle is stopped.

By limiting a brake line pressure increase, it may be possible to reduce vacuum consumption in a vehicle. Specifically, pressure in brake lines supplying wheel brakes may be limited via closing a valve located between a master cylinder piston and wheel brakes. Closing the valve limits master cylinder piston motion because brake fluid between the master cylinder piston and valve is nearly incompressible, thereby limiting master cylinder piston motion when the valve is closed and the brake is applied. The master cylinder piston is also mechanically coupled to a diaphragm in the brake booster that separates a brake booster working chamber from a brake booster vacuum chamber. Consequently, brake booster diaphragm motion is limited when master cylinder piston motion is limited. The brake booster diaphragm defines one side of the brake booster working chamber, and brake booster working chamber volume is substantially fixed (e.g., changes by less than 10% of total brake booster volume) when motion of the diaphragm is limited via the master cylinder piston. As a result, a driver may only decrease vacuum in the working chamber to an extent determined by the volume of the brake booster working chamber, which is related to the brake booster diaphragm position. In this way, vehicle brakes may be applied to provide a desired amount of braking force while brake booster vacuum consumption is limited.

The present description may provide several advantages. In particular, the approach may conserve vacuum in a vehicle so that the vehicle's engine operates for less time at low intake manifold pressures. The approach may also conserve fuel since the engine may be able to operate more efficiently at higher intake manifold pressures for longer periods of time. Additionally, the approach conserves vacuum responsive to vehicle operating conditions such as road grade and vehicle mass.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
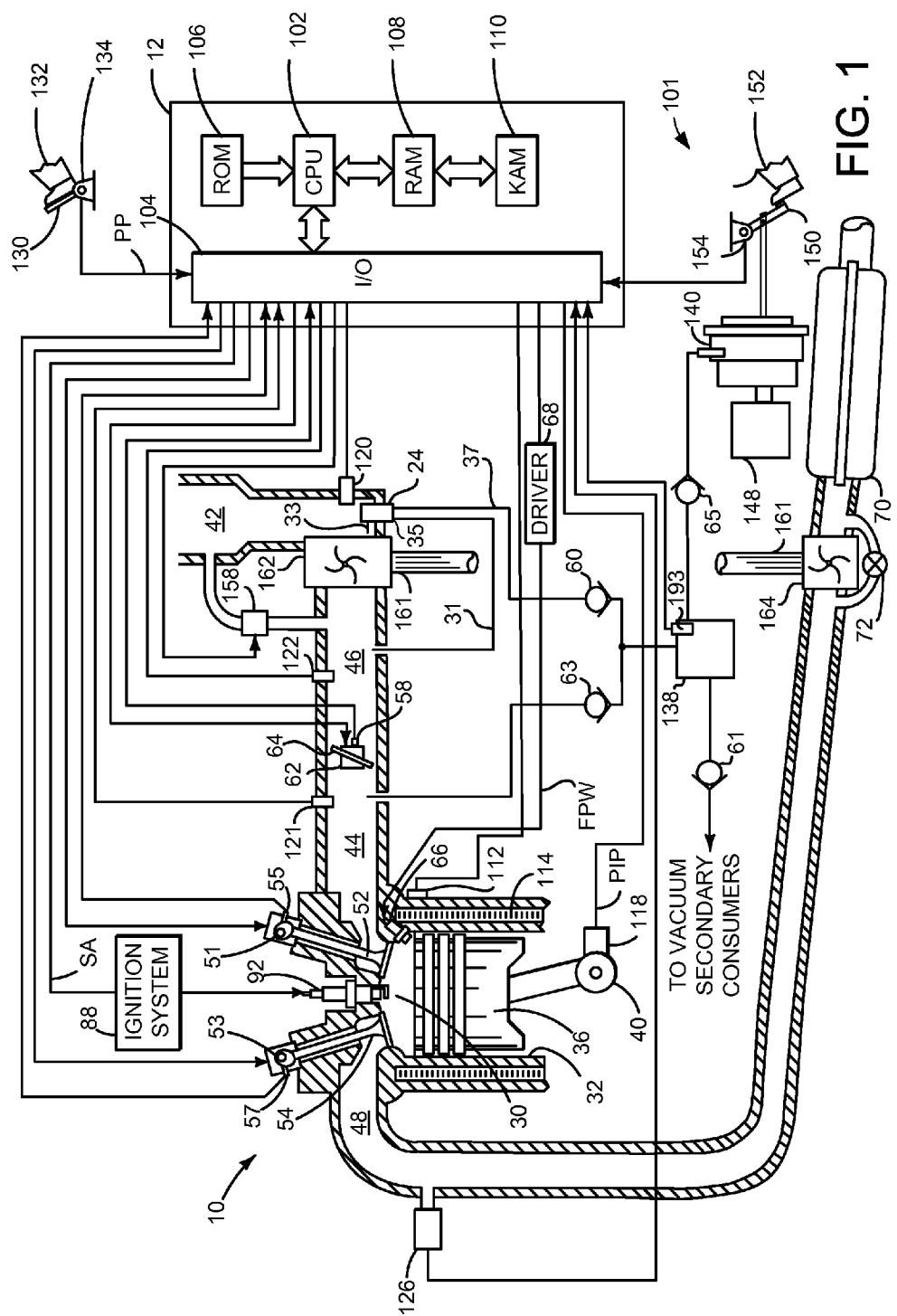
FIG. 1 shows a schematic depiction of an engine and a portion of a braking system.
Figure 2:
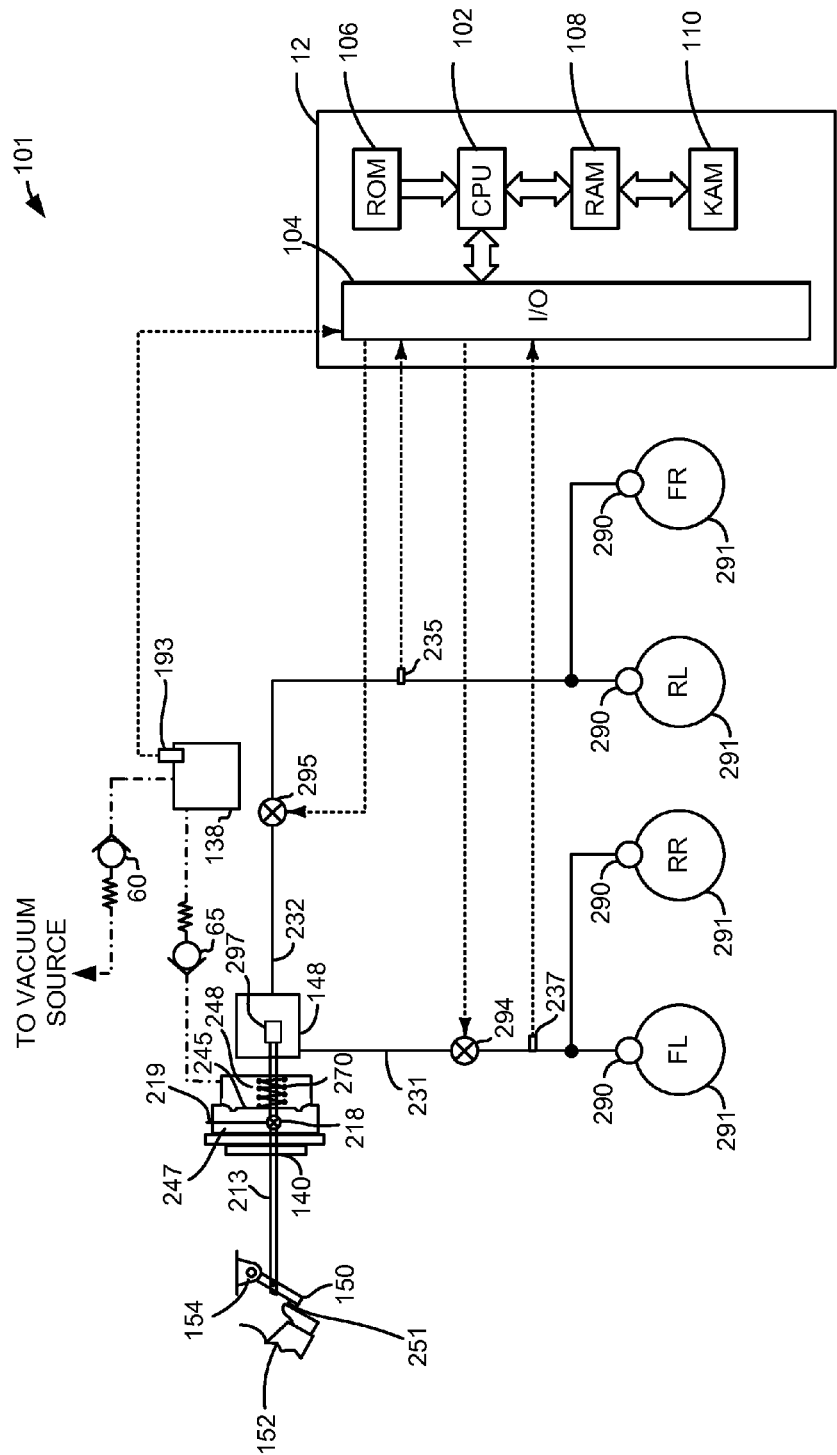
FIG. 2 shows an example vehicle braking system where the method of FIG. 4 may be applied to conserve vacuum.
Figure 3:
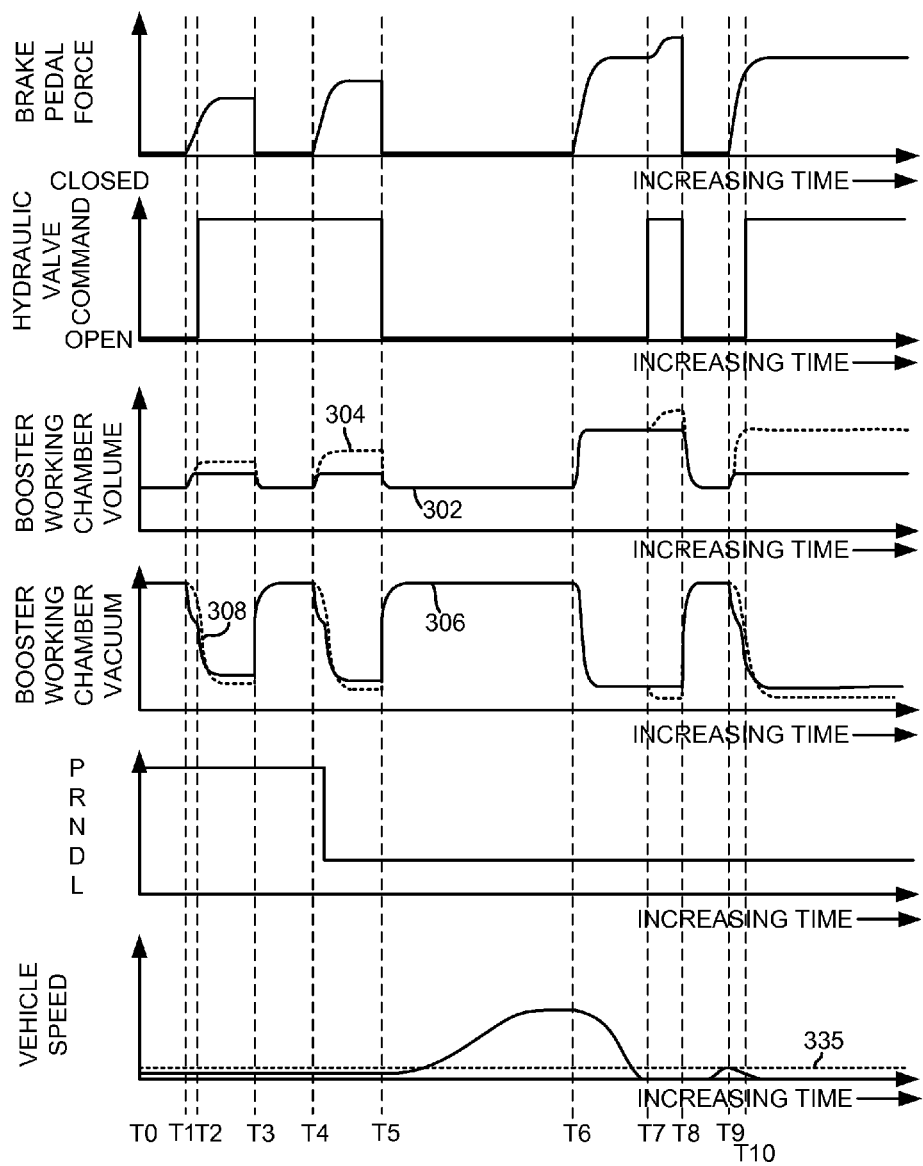
FIG. 3 shows an example operating sequence where vacuum of a vacuum system is conserved.
Figure 4:
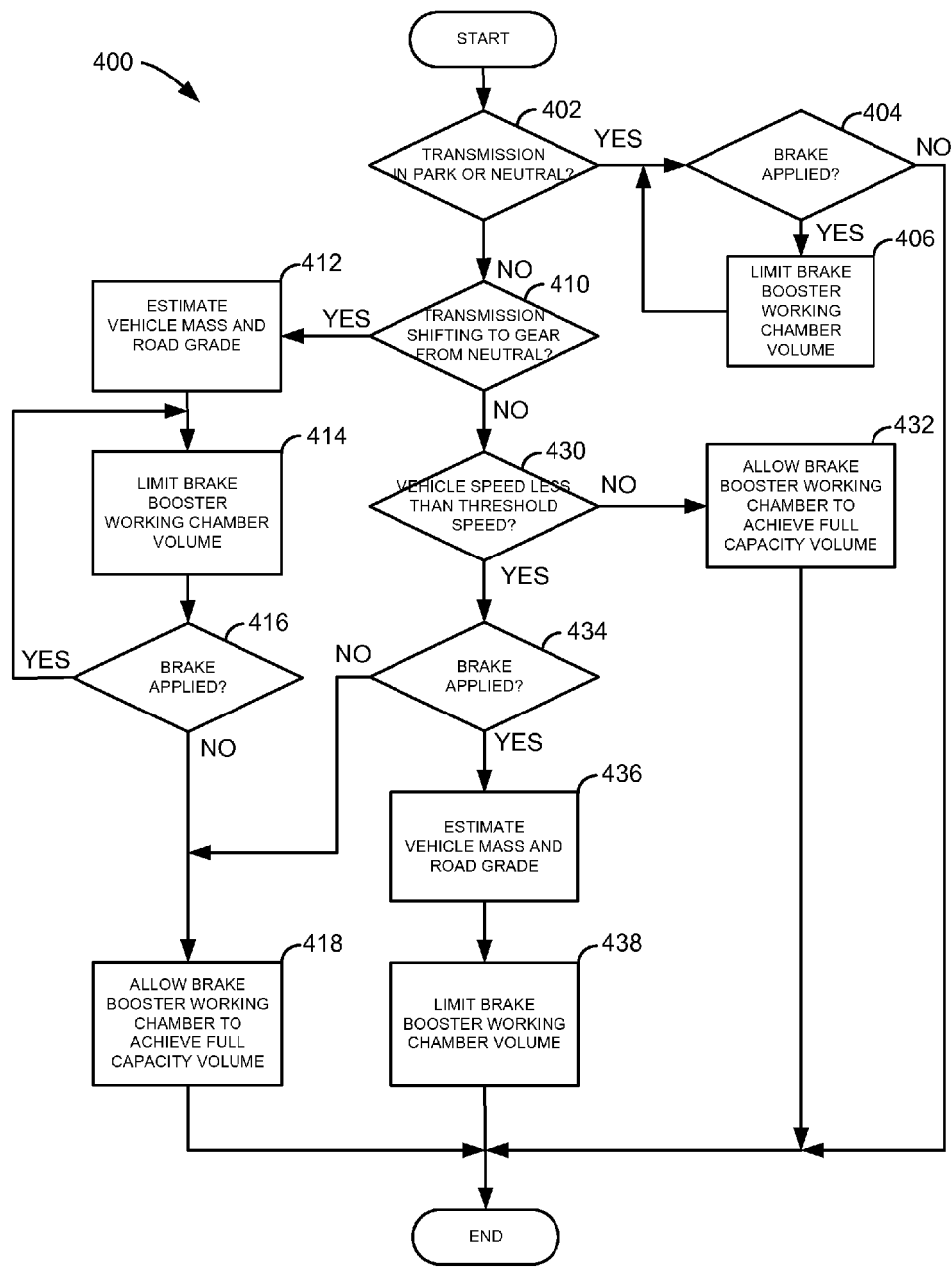
FIG. 4 shows an example method for conserving vacuum.

The present description is related to conserving vacuum for a vehicle. FIGS. 1 and 2 show an example system for providing vacuum for a vehicle. FIG. 3 shows an example sequence where vacuum is conserved while operating a vehicle. FIG. 4 shows a method for conserving vacuum for use in vehicle systems.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air from air intake passage 42 to supply boost chamber 46. Exhaust gases spin turbine 164 which is coupled to compressor 162 via shaft 161. Compressor bypass valve 158 may be electrically operated via a signal from controller 12. Compressor bypass valve 158 allows pressurized air to be circulated back to the compressor inlet to limit boost pressure. Similarly, waste gate actuator 72 allows exhaust gases to bypass turbine 164 so that boost pressure can be controlled under varying operating conditions.

Vacuum is supplied to vehicle systems via vacuum providing device 24 (e.g. an aspirator/ejector/venturi pump). In this example, the aspirator is placed between the compressor outlet and the compressor inlet. In some examples, the aspirator may also be placed between the filtered air inlet and the intake manifold. Further, the aspirator can be placed across any two differing pressure potentials. Compressor 162 provides compressed air as a motive fluid via converging section duct 31 to converging section 35 of vacuum providing device 24 (e.g., an ejector). The motive fluid is combined with air from vacuum reservoir 138 via vacuum port duct 37 and check valve 60. Check valve 60 allows flow when the pressure produced via the ejector within vacuum port duct 37 is lower than the pressure within reservoir 138. Mixed air exits at diverging section 33. In some examples, vacuum reservoir 138 may be referred to as a vacuum system reservoir since it can supply vacuum throughout the vacuum system and since brake booster 140 may contain a vacuum reservoir too. Pressure in reservoir 138 may be monitored via vacuum reservoir pressure sensor 193. Vacuum system reservoir 138 provides vacuum to brake booster 140 via check valve 65. Check valve 65 allows air to enter vacuum system reservoir 138 from brake booster 140 and substantially prevents air from entering brake booster 140 from vacuum system reservoir 138. Vacuum system reservoir 138 may also provide vacuum to other vacuum consumers such as turbocharger waste gate actuators, heating and ventilation actuators, driveline actuators (e.g., four wheel drive actuators), fuel vapor purging systems, engine crankcase ventilation, and fuel system leak testing systems. Check valve 61 limits air flow from secondary vacuum consumers (e.g., vacuum consumers other than the vehicle braking system) to vacuum system reservoir 138. Brake booster 140 may include an internal vacuum reservoir, and it may amplify force provided by foot 152 via brake pedal 150. Brake booster 140 is coupled to master cylinder 148 for applying vehicle brakes (not shown). Brake booster 140 and brake pedal 150 are part of vehicle braking system 101. In this example, brake booster 140 is an active brake booster where vacuum within a working side of brake booster 140 is based on a position of brake pedal 150. Closing a valve between master cylinder and wheel cylinder may also be employed for conventional boosters (not active) that have a mechanical valve that allows atmospheric air to enter the working chamber. Brake pedal 150 may be mechanically coupled to brake booster 140 so that during some conditions brake pedal 140 directly operates master cylinder 148. During other conditions, brake fluid pressure produced by master cylinder 148 is based on the net force of the booster force and brake pedal force, but brake pedal 140 does not directly operate master cylinder 148. If brake pedal 140 is not directly operating on master cylinder 148 and the brake pedal is applied, pressure in a working chamber of brake booster 140 is adjusted via adjusting valves described in FIG. 2.

The operator's foot and the brake booster may apply a high force on the master cylinder resulting in a high master cylinder fluid pressure, but since an isolation valve(s) is closed, the wheel cylinders see a reduced line pressure as compared to if the valve were open. Closing the valve reduces stroke of the master cylinder and the brake booster which conserves vacuum. If a conventional brake booster is used, vacuum conservation comes only from the reduced brake stroke. If an active brake booster is present where valves control air flow into and out of the brake booster working chamber, vacuum is additionally conserved via limiting the atmospheric air entering the working chamber.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a first example braking system where the method of FIG. 4 may be applied is shown. Braking system 101 of FIG. 2 may be included with the engine shown in FIG. 1. Hydraulic lines are shown solid, electrical connections are shown as dashed, and pneumatic connections are shown as dash-dot.

Braking system 101 includes a brake pedal 150 and a brake position sensor 154. In some examples, brake system 101 may also include a brake pedal force sensor 251. Brake pedal 150 may be operated by foot 152 to move rod 213. Rod 213 is mechanically coupled to diaphragm 245. Diaphragm 245 is also mechanically coupled to piston 297 of master cylinder 148. The position of diaphragm 245 is adjusted via brake pedal force, vacuum levels in working chamber 247 and vacuum chamber 248, and return spring 270 when hydraulic control valves 295 and 294 are open. By changing the position of diaphragm 245 the volume of working chamber 247 may be adjusted. In particular, when hydraulic control valves 294 and 295 are open, volume (and pressure) in working chamber 247 may be increased when force applied to rod 213 allows air enter working chamber 247 and displace diaphragm 245. However, if hydraulic control valves 294 and 295 are closed, an increase in volume of working chamber 247 may be limited even when additional force is applied to rod 213. Closing hydraulic valves 294 and 295 fixes the volume of brake fluid between master cylinder piston 297 and valves 294 and 295, thereby limiting motion of piston 297, even if additional force is applied to brake pedal 150 or diaphragm 245 after hydraulic control valves 294 and 295 are closed.

Working chamber 247 selectively receives air from a high pressure source (e.g., atmospheric pressure) via a port to atmosphere 219 when rod 213 moves to allow a valve 218 to vent brake booster working chamber 247 to atmosphere. Valve 218 also allows air to pass from working chamber 247 to vacuum chamber 248 when brake pedal 150 is released. Valve 218 does not allow air into working chamber 247 from atmosphere when air passes from working chamber 247 to vacuum chamber 248. In this way, vacuum in working chamber 247 may be displaced or added so that additional force is applied or removed from diaphragm 247.

Pressure sensor 235 senses pressure in first brake line 232 downstream of hydraulic control valve 295. Pressure sensor 237 senses pressure in second brake line 231 downstream of hydraulic control valve 294. Controller 12 operates hydraulic control valves 294 and 295 in response to output of pressure sensors 235 and 237, vehicle speed, and transmission operating state.

Vacuum reservoir 138 supplies vacuum to brake booster 140 via check valve 65. Pressure in vacuum reservoir 138 is sensed via pressure sensor 193. In some examples, vacuum reservoir 138 may be incorporated into brake booster 140. Vacuum is supplied to vacuum reservoir 138 via check valve 60. Vacuum is supplied to check valve 60 via the engine intake manifold or a device such as an ejector.

Master cylinder 148 may supply pressurized brake fluid to brakes 290 for stopping rotation of wheels 291. Brake lines 231 and 231 allow fluidic communication between master cylinder 148 and brakes 290. The front left vehicle wheel is designated FL, the front right wheel is designated FR, the right rear wheel is designated RR, and the rear left wheel is designated RL.

Thus, the system of FIGS. 1 and 2 provides for conserving vacuum, comprising: a transmission; vehicle brakes; a brake pedal; a vacuum brake booster coupled to the brake pedal and in communication with the vehicle brakes; a master cylinder including a piston, the master cylinder coupled to the vacuum brake booster and in fluidic communication with the vehicle brakes; and a controller including executable instructions stored in non-transitory memory to limit motion of the piston while the transmission is being shifted and while the brake pedal is applied. The system includes where the transmission is shifted from neutral or park into a forward gear. The system includes where motion of the piston is limited via closing a valve positioned along a brake line extending from the master cylinder to the vehicle brakes. The system further comprises an engine and additional instructions to automatically stop the engine and piston motion while the engine is stopped. The system further comprises additional instructions to control brake line pressure at the vehicle brakes based on road grade. The system includes where limiting motion of the piston limits brake booster working chamber volume expansion.

Referring now to FIG. 3, operating characteristics of the vacuum conservation method of FIG. 4 are shown. The sequence of FIG. 3 may be provided by the method of FIG. 4 being performed in the system of FIGS. 1 and 2. Vertical markers T0-T10 represent times of particular interest in the sequence.

The first plot from the top of FIG. 3 represents brake pedal force versus time. Alternatively, brake position may be substituted for brake pedal force. The X axis represents time and time increases from the left side of FIG. 3 to the right side of FIG. 3. The Y axis represents brake pedal force and the brake pedal is at a base position when the trace is at the X axis. The brake pedal force increases in the direction of the Y axis arrow. The brake pedal is not applied when brake pedal force is zero or at the X axis.

The second plot from the top of FIG. 3 represents a command to hydraulic brake control valves (e.g., hydraulic control valves 294 and 295 of FIG. 2). The X axis represents time and time increases from the left side of FIG. 3 to the right side of FIG. 3. The Y axis represents hydraulic brake control valve command and the hydraulic brake control valve is commanded open when the hydraulic brake valve command is a low value near the X axis. The hydraulic brake control valve is commanded closed when the hydraulic brake valve command is a high value near the Y axis arrow. By commanding the hydraulic brake control valve closed, the positions of master cylinder piston 297 and diaphragm 245 of FIG. 2 are limited from moving.

The third plot from the top of FIG. 3 represents brake booster working chamber volume versus time. The X axis represents time and time increases from the left side of FIG. 3 to the right side of FIG. 3. The Y axis represents brake booster working chamber volume and the brake booster working chamber volume increases in the direction of the Y axis arrow. Trace 302 is a solid line and it represents a brake booster working chamber volume according to the method of FIG. 4. Trace 304 is a dashed line and it represents brake booster working chamber volume that is based solely on brake pedal force/position. Where only the solid line is visible, both traces 302 and 304 are at the same level.

The fourth plot from the top of FIG. 3 represents brake booster working chamber vacuum versus time. The X axis represents time and time increases from the left side of FIG.

3 to the right side of FIG. 3. The Y axis represents brake booster working chamber vacuum and brake booster working chamber vacuum increases (e.g., pressure decreases) in the direction of the Y axis arrow. Trace 306 is a solid line and it represents brake booster working chamber vacuum when the method of FIG. 4 in the system of FIGS. 1 and 2 controls vacuum in the brake booster working chamber. Trace 308 is a dashed line and it represents brake booster working chamber vacuum that is based solely on brake pedal position. Where only the solid line is visible, both traces 306 and 308 are at the same level. When deployed in the conventional booster, lines 308 and 306 are coincident. When deployed in an active booster, less atmospheric air is allowed into the working chamber thus, the vacuum is deeper in the active booster than in the conventional booster. While one system conserves more vacuum than the other, both may conserve vacuum over the state of the art.

The fifth plot from the top of FIG. 3 represents selected transmission gear versus time. The X axis represents time and time increases from the left side of FIG. 3 to the right side of FIG. 3. The Y axis represents transmission gear. P represents park, R represents reverse, N represents neutral, D represents drive, and L represents low. The vehicle's transmission is in the gear represented by the level of the trace.

The sixth plot from the top of FIG. 3 represents vehicle speed versus time. The X axis represents time and time increases from the left side of FIG. 3 to the right side of FIG. 3. The Y axis represents vehicle speed and vehicle speed increases in the direction of the Y axis arrow. Vehicle speed is zero when the trace is near the X axis. Horizontal line 335 represents a threshold vehicle speed below which the hydraulic control valves may be closed responsive to brake pedal position and vehicle speed. In other words, if the brake pedal is applied and vehicle speed is less than threshold 335, the hydraulic control valves may be closed to limit brake line pressure and to limit vacuum consumption to a threshold level that stops the vehicle but that does not continue to consume vacuum as additional force is applied to the brake pedal.

At time T0, the vehicle is stopped and the transmission is in park. The hydraulic control valve command (e.g., the command for valves 294 and 295 of FIG. 2) is low indicating the vehicle brake pressure is not being limited. The brake pedal is not applied and the transmission is in park. The brake booster working chamber volume is at a lower level indicating that the brake booster diaphragm is not deflecting significantly due to brake pedal force and the pressure differential across the diaphragm. The brake booster working chamber vacuum is at a higher level. Such conditions are indicative of conditions when a vehicle is parked and the engine is operating or stopped.

At time T1, the brake pedal is applied and the engine is started via engaging a pushbutton or starter switch while the transmission is still in park. Applying the brake may be a requirement for engaging an engine starter and starting the vehicle when the vehicle is stopped and in park. The brake booster working chamber volume begins to increase and the vacuum chamber volume decreases (not shown) in response to air entering the working chamber and brake pedal position (e.g., the brake is being applied). Brake booster working chamber vacuum decreases in response to air entering the brake booster working chamber and brake pedal position (e.g., brake pedal position determines air flow rate into the brake booster working chamber). The transmission remains in park and the hydraulic control command remains not asserted so that the hydraulic control valve remains open. The vehicle braking force increases when the hydraulic valve command is not asserted and brake pedal application force increases. The vehicle also remains in a stopped state. Such conditions may be present when a person subconsciously applies the vehicle brake while the vehicle is parked.

At time T2, the hydraulic valve command is asserted and the hydraulic brake valve closes in response to vehicle braking force reaching a threshold level (not shown). In one example, vehicle braking force may be determined from pressures within brake lines that provide brake fluid to vehicle brakes. For example, a brake line pressure may be used to index a table or function that outputs a braking force. The threshold vehicle braking force may be determined based on vehicle mass, road grade, and a predetermined braking offset. The method of FIG. 4 limits brake booster working chamber volume at the level indicated by trace 302 in response to closing the hydraulic control valve. For systems that adjust brake booster working chamber vacuum based on brake pedal position, the brake booster working chamber volume increases to the level indicated by trace 304. Thus, the method of FIG. 4 limits brake booster working chamber volume so that less air may enter the brake booster, thereby reducing vacuum consumption.

The brake pedal force continues to increase and the brake booster working chamber vacuum decreases as air enters the brake booster working chamber. The brake booster working chamber vacuum operating according to the method of FIG. 4 decreases at a faster rate as indicated by trace 306, but not as to the reduced vacuum level of trace 308, since the brake booster working chamber volume is limited. The brake booster working chamber vacuum operating according to the method that adjusts brake booster working chamber vacuum based solely on brake pedal position decreases at a slower rate as indicated by trace 308 since the brake booster working chamber volume is increasing. Additionally, trace 308 goes to a lower vacuum level since the brake pedal allows brake booster vacuum control valve 218 of FIG. 2 to open further since motion of the brake pedal is not limited by the hydraulic control valve. Note the difference in the systems. The operator may apply the same brake force in both cases, but in the one case (where the hydraulic control valve is closed at T2) the brake line pressure is limited, yet sufficient to hold the vehicle stopped even if the vehicle were not in park. Thus, vehicle controls prevent needless extra brake booster stroke that would consume additional vacuum.

At time T3, the brake pedal is released as indicated by the brake pedal position transitioning to a lower level. The hydraulic control valve command remains asserted so that the hydraulic control valve remains closed. The hydraulic control valve remains closed so that the master cylinder piston movement is limited when the vehicle brakes are applied, thereby limiting vacuum consumption by the brake booster. The brake booster working chamber volume decreases for the method of FIG. 4 (e.g., trace 302) and for the method where brake booster working chamber vacuum varies with brake pedal position and application force (e.g., trace 304) in response to the brake pedal being released. Additionally, brake booster vacuum increases for the method of FIG. 4 (e.g., trace 306) and for the method where brake booster working chamber vacuum varies with brake pedal position and application force (e.g., trace 308) in response to the brake pedal being released. The transmission remains in park and the vehicle remains stopped.

At time T4, the brake pedal is applied for a second time as a pre-requisite to changing the transmission PRNDL selection. The brake is applied to allow the transmission to be shifted into drive as is shown shortly thereafter. The hydraulic control valve remains closed to limit movement of the brake booster diaphragm, thereby limiting vacuum consumption.

The brake booster working chamber volume increases for the method of FIG. 4, trace 302, and for the method where brake booster working chamber vacuum is adjusted based on brake pedal position, trace 304, but the method of FIG. 4 limits brake booster working chamber volume, whereas the method where brake booster working chamber vacuum is adjusted based on brake pedal position is allowed to increase even further. The brake booster working chamber vacuum decreases an additional amount for the method that adjusts brake booster vacuum solely based on brake pedal position, trace 308, because additional brake force moves the brake pedal and allows more air into the brake booster working chamber. On the other hand, for the system that operates according to the method of FIG. 4, trace 306, the brake booster working chamber vacuum is limited since the master cylinder piston is limited from moving by the hydraulic control valve being closed. Limiting the master cylinder piston motion limits brake booster diaphragm motion and opening of the brake booster vacuum valve 218. Consequently, the method where brake booster working chamber vacuum is adjusted based solely on brake pedal position consumes more vacuum than the method of FIG. 4. The transmission is shifted from park to drive while the brake pedal is applied and vehicle speed remains at zero.

At time T5, the brake pedal is released by the driver and the hydraulic control valve command changes state to a not asserted state in response to the brake pedal being released. However, in some examples, the hydraulic control valve may remain closed until a driver or engine demand torque is increased. The brake booster working chamber volume for the method of FIG. 4, trace 302, and for the method where brake booster vacuum is adjusted based on brake pedal position, trace 304, both decrease as the brake booster diaphragm deflection is reduced in response to the pressure differential across the brake booster diaphragm being reduced. The brake booster working chamber vacuum also increases for both the method of FIG. 4, trace 306, and for the method where brake booster working chamber vacuum is adjusted based on brake pedal position, trace 308, in response to the brake pedal being released. The vehicle remains in drive and vehicle speed begins to increase between time T5 and time T6.

At time T6, vehicle speed is increased and the vehicle brakes are applied. The hydraulic control valve command remains not asserted so that the driver may apply full braking force while the vehicle is moving. The brake booster working chamber volume for the method of FIG. 4, trace 302, and for the method where brake booster working chamber volume is adjusted based on brake pedal position, trace 304, both increase in response to increasing brake pedal force. Thus, vacuum is consumed equally by the system that operates according to method 4 and the system that operates solely based on brake pedal position. The vehicle remains in drive and the vehicle begins to decelerate. Since the vehicle is moving, the brakes operate normally and no vacuum conservation measures are provided. The vehicle stops just prior to time T7.

At time T7, the driver applies additional force and the brake pedal position is further displaced from the base brake pedal position after the vehicle has stopped. The hydraulic control valve command is asserted to close the hydraulic control valve in response to the increasing brake force. Alternatively, the hydraulic control valve may be asserted in response to vehicle speed reaching zero vehicle speed. The brake booster working chamber volume for the method of FIG. 4, trace 302, becomes limited in response to the hydraulic control valve closing. The brake booster working chamber volume for the method that adjusts brake booster working chamber vacuum based solely on brake pedal position, trace 304, continues to increase in response to the increasing brake pedal position (not shown) as brake pedal force increases. The brake booster working chamber vacuum stays at a same value as prior to time T7 for the system that applies the method of FIG. 4. The brake booster working chamber vacuum decreases for the system that adjusts brake booster vacuum solely responsive to brake pedal position since the brake pedal is allowed to travel further when brake pedal force is increased. The vehicle remains in drive and vehicle speed remains at zero.

At time T8, the brake pedal is released by the driver and the hydraulic control valve command changes state to a not asserted state in response to the brake pedal being released. However, in some examples, the hydraulic control valve may remain closed until a driver or engine demand torque is increased. The brake booster working chamber volume for the method of FIG. 4, trace 302, and for the method where brake booster vacuum is adjusted solely based on brake pedal position, trace 304, both decrease as the brake booster diaphragm deflection is reduced in response to the pressure differential across the brake booster diaphragm being reduced. The brake booster working chamber vacuum also increases for both the method of FIG. 4, trace 306, and for the method where brake booster working chamber vacuum is adjusted based on brake pedal position, trace 308, in response to the brake pedal being released. The vehicle remains in drive and vehicle speed begins to increase between time T8 and time T9.

At time T9, the vehicle is moving at a speed below threshold speed 335 and the driver applies the brake pedal as indicated by increasing brake pedal force. The brake booster working chamber volume for the method of FIG. 4, trace 302, and the method that adjusts brake booster working chamber vacuum solely based on brake pedal position, trace 304, increase in response to the increasing brake pedal force. Further, the brake booster working chamber vacuum for the method of FIG. 4, trace 306, decreases in response to increasing force applied to the brake pedal. The brake booster working chamber vacuum for the method that adjusts brake booster working chamber vacuum in response to brake pedal position also decreases in response to the brake pedal position changing as the brake force is increased. The vehicle remains moving and the transmission remains in drive.

At time T10, the hydraulic control valve command changes state to close the hydraulic control valve in response to braking force reaching a threshold braking force. In one example, the threshold braking force is based on brake line pressure. The brake line pressure is used to index a function or table of empirically determined values of vehicle brake force based on brake line pressure. The brake booster working chamber volume is limited in response to the hydraulic control valve closing as indicated by trace 302 for a system that operates according to the method of FIG. 4. For the system that adjusts brake booster vacuum in response to brake pedal position, the brake booster working chamber volume continues to increase as brake force increases and as the brake pedal is displaced further from its base position as indicated by trace 304. The brake booster working chamber vacuum for the system operating according to the method of FIG. 4 decreases as shown by trace 302, but the decrease is limited since the diaphragm position limits opening of valve 218 shown in FIG. 2. The brake booster working chamber vacuum for the system that adjusts brake booster working chamber vacuum based on brake pedal position is reduced to a lower level than the brake booster working chamber vacuum based on the method of FIG. 4 as indicated by trace 304. Thus, the method of FIG. 4 limits brake booster working chamber vacuum reduction and braking force in response to vehicle speed, transmission gear, and brake pedal application force, and desired braking force. The vehicle decelerates to a stop and the transmission remains in drive.

Referring now to FIG. 4, an example method for conserving vacuum is shown. The method of FIG. 4 may be stored as executable instructions in non-transitory memory of the system shown in FIGS. 1 and 2. Further, the method of FIG. 4 may provide the operating sequence shown in FIG. 3.

At 402, method 400 judges whether or not the vehicle's transmission is in park or neutral. The transmission gear may be determined from output of a gear selector sensor. If method 400 determines that the transmission is in park or neutral the answer is yes and method 400 proceeds to 404. Otherwise, the answer is no and method 400 proceeds to 410. In addition, the engine may not be started or may be in the process of being started in response to a request to start the engine at 402. For example, the engine may be being started in response to a driver depressing a push button start device.

At 404, method 400 determines whether or not the brake pedal is applied. The brake pedal position is an indication of whether or not the brake pedal is applied. If method 400 judges that the brake pedal is applied the answer is yes and method 400 proceeds to 406. Otherwise, the answer is no and method 400 proceeds to exit. The vehicle engine may be stopped or rotating at 404.

At 406, method 400 limits brake boost assist and brake booster working chamber volume. In one example, brake boost assist is limited based on road grade, atmospheric pressure, and vehicle mass. Road grade may be determined via in inclinometer or an accelerometer. Vehicle mass may be estimated via the following equation:

$$Mv = (Tw1 - Tw2) + \frac{(Tr2 - Tr1)}{Rrr \cdot g \cdot (\sin\Theta1 - \sin\Theta2)}$$

Where Mv is mass of the vehicle, Tw1 is torque at the vehicle wheel for grade 1, Tw2 is torque at the vehicle wheel for grade 2, Rrr is driven wheel rolling radius, g is gravity constant, Trl1 is road load at driven wheel on grade 1, Trl2 is road load at driven wheel grade 2, $\Theta1$ is road 1 angle, and $\Theta2$ is road 2 angle.

In one example, a desired braking force may be used to index a table or function that outputs a brake line pressure that provides the desired braking force. In particular, brake line pressure is used to index a function or table stored in memory that holds empirically determined valves of vehicle brake force based on brake line pressure. If the vehicle is parked or in neutral on a flat road, the table or function outputs a desired brake line pressure to hold the vehicle stopped (e.g., a pressure increase that corresponds to 5 N-m). In one example, the base force to hold the vehicle stopped may include an additional force amount to keep the vehicle stopped due to unforeseen conditions (e.g., 5 N-m).

In addition, braking force may be added to the base amount of brake force based on vehicle mass and road grade. If vehicle mass is greater than a base vehicle mass, the braking force is increased as a function of vehicle mass. The increase in brake force due to vehicle mass may be empirically determined and stored in memory as a function of vehicle mass. The increase in brake force due to road grade may be empirically determined and stored in memory as a function of road grade. The increases in brake force are converted to increases in brake line pressure, and the brake line pressure is increased or decreased to the desired pressure via opening or closing the hydraulic control valve (e.g., valves 294 and 295 in FIG. 2). The brake line pressure may be increased when the brake pedal is depressed with an increasing amount of force while the hydraulic control valves are open. The brake line pressure may be held at a desired pressure by closing the hydraulic control valves when brake line pressure reaches a desired pressure. Brake line pressure may be reduced when brake pedal force is reduced and when the hydraulic control valves are open. Additionally, brake line pressure may be adjusted via adjusting output of a pump supplying brake fluid to vehicle brakes.

By opening and closing the hydraulic control valves, the brake booster working chamber volume and brake boost assist may be limited. For example, the hydraulic control valves may be closed when brake line pressure reaches a desired brake line pressure based on road grade, engine torque, transmission gear, and vehicle mass. The brake line pressure is held at the brake line pressure present when the hydraulic valves were closed. Closing the hydraulic control valves limits master cylinder piston motion by not allowing brake fluid between the master cylinder and hydraulic control valve to be displaced. Limiting master cylinder piston motion also limits brake booster diaphragm motion, brake booster working chamber volume, and brake pedal motion since the master cylinder piston is coupled to the brake booster diaphragm and the brake pedal.

Additionally, in some examples a valve may be placed between atmosphere and the brake booster working chamber to limit air flow into the brake booster working chamber when the brake pedal is applied. For example, if the brake line pressure reaches a desired pressure, air flow to the brake booster working chamber may be stopped along with closing the hydraulic control valve.

The brake line pressure is adjusted to supply the base braking force and braking force for road grade and vehicle mass in response to the brake pedal being initially applied; however, brake force is not adjusted proportionally with brake pedal position so that vacuum may be conserved. In one example, if the vehicle is in park or neutral, the brake line pressure is maintained until the vehicle is shifted into reverse or a forward gear. Method 400 returns to 404 after brake boost assist is limited. If the transmission is in park, no compensation for road grade or vehicle mass is provided.

At 410, method 400 judges whether or not the vehicle's transmission is in neutral or in a gear. In one example, method 400 may judge that the transmission is being shifted based on a position of a gear selector. Additionally, the vehicle brake must be applied to shift from park or neutral into a gear. If method 400 judges that the transmission is being shifted from neutral or park into a gear, the answer is yes and method 400 proceeds to 412. Otherwise, the answer is no and method 400 proceeds to 430.

At 412, method 400 estimates vehicle mass and road grade. In one example, vehicle mass is determined as described at 406. Road grade is determined via an inclinometer. Method 400 proceeds 414 after vehicle mass and road grade are determined.

At 414, method 400 limits brake booster assist and brake line pressure to limit vehicle motion while the vehicle brake pedal is applied allowing the transmission to be shifted. A base brake force to hold the vehicle stopped is estimated based on engine torque delivered to vehicle wheels, vehicle mass, road grade, and barometric pressure. Torque at the vehicle wheels produced by the engine is estimated by indexing a table or function using engine speed and load. The table outputs an engine torque and the engine torque is multiplied by factors for gear ratios between the engine and the wheels as well as for torque converter torque multiplication to determine torque at the wheels produced by the engine. Torque at the wheels from the engine is added to torque at the wheels due to road grade. Torque the wheels due to road grade is mass of the vehicle multiplied by the gravity constant multiplied by the sine of the road angle.

The desired braking force is increased to provide a braking force that is equivalent to the engine torque produced at the vehicle wheels plus the torque due to vehicle mass and road grade plus a predetermined additional amount of torque. The braking force is produced via increasing the brake line pressure to a pressure that produces the desired braking force. The brake line pressure is increased by the driver applying the brake pedal and opening the hydraulic control valve. In one example, the desired braking force is input to an empirically determined function or table that outputs a desired brake line pressure and the hydraulic control valve is closed when the desired brake line pressure is achieved by the driver applying force to the brake pedal. The brake line pressure may be measured and compared against the desired brake line pressure to adjust the brake line pressure via closed-loop control. Method 400 proceeds to 416 after the brake line pressure is adjusted and limited to a desired brake line pressure. Additionally, limiting brake line pressure via closing the hydraulic control valve limits brake booster working chamber volume since master cylinder piston motion is limited when the hydraulic control valve are closed as previously described. It should be noted that the brake line pressure is not adjusted proportional to brake pedal position when the vehicle is stopped and the hydraulic control valves are closed. In this way, vacuum consumption may be decreased.

At 416, method 400 judges whether or not the vehicle brake pedal is applied. The vehicle brake pedal may be judged applied or not applied based on brake pedal position or brake pedal force. If method 400 judges that the brake pedal is applied, method 400 returns to 414. Otherwise, the answer is no and method 400 proceeds to 418.

At 418, method 400 increases vacuum in the brake booster working chamber and opens the hydraulic control valve. The pressure differential across the brake booster diaphragm is also reduced when the brake is release. Thus, 418 shows normal brake system operation since the brakes are not applied and the vehicle is in gear. Method 400 exits after opening the hydraulic control valve and reducing the pressure differential across the brake booster diaphragm.

At 430, method 400 judges whether or not vehicle speed is less than a threshold vehicle speed (e.g., 2 KPH). If method 400 judges that vehicle speed is less than a threshold vehicle speed, method 400 proceeds to 434. Otherwise, the answer is no and method 400 proceeds to 432. In some examples, if vehicle motion is detected, brake assist is provided and vacuum consumption by the brake booster is not limited. The threshold speed in such cases may be used to reduce the uncertainty of detecting zero vehicle speed.

At 432, method 400 adjusts brake booster working chamber vacuum and/or pressure differential across the brake booster diaphragm in proportion to the position of the vehicle brake pedal. Additionally, the hydraulic control valve is opened and the brake booster working chamber is allowed to achieve full capacity volume when the brake is applied. At 432, the brakes are operating normally since the vehicle is in motion. Pneumatic boost assist is not limited nor is hydraulic brake pressure, with the exception of anti-lock braking conditions. For example, if the brake is being applied and brake pedal position is moving away from a base brake pedal position, the pressure differential across the brake booster is increased to increase braking force. The pressure differential across the brake booster diaphragm is increased via applying the brake pedal. The pressure in the brake lines increases as the brake pedal force increases. Braking force may be increased or decreased at 432 depending on brake pedal position. Method 400 proceeds to exit after the hydraulic control valve is opened and brake booster working pressure and/or the pressure differential across the brake booster is adjusted.

At 434, method 400 judges whether or not the vehicle brake is applied. The vehicle brake may be judged applied or not applied based on brake pedal position. If method 400 judges that the brake pedal is applied, the answer is yes and method 400 proceeds to 436. Otherwise, the answer is no and method 400 proceeds to 418.

At 436, method 400 estimates vehicle mass and road grade as described at 412 and 406. Method 400 proceeds to 438 after vehicle mass and road grade are estimated. In some examples, the vehicle's engine may be automatically stopped based on vehicle operating conditions without a driver directly stopping the engine. For example, the engine may be automatically stopped when the vehicle speed is zero and engine load is less than a threshold load.

At 438, method 400 limits brake boost assist, brake booster working chamber volume, and brake line pressure to limit vehicle motion as described at 414. Method 400 proceeds to exit after brake boost assist, brake booster working chamber volume, and brake line pressure are limited. Thus, even if the vehicle is moving at a slow speed, the brake boost amount may be limited so as to conserve vacuum.

Thus, the method of FIG. 4 provides for a method for conserving vacuum, comprising: limiting a brake line pressure increase at a wheel brake in response to an increasing in brake pedal force when a vehicle is stopped. The method includes where the brake line pressure increase is limited via closing a valve located along a brake line, the brake line extending from a master cylinder to the wheel brake. The method further comprises holding the brake line pressure at a pressure based on road grade. The method further comprises holding the break line pressure at a pressure based on vehicle mass. The method further comprises decreasing vacuum in a brake booster working chamber while limiting the brake line pressure increase.

In some examples, the method further comprises limiting the brake line pressure increase in response to a transmission of the vehicle being in park or neutral. The method further comprises limiting the brake line pressure increase in response to the increasing brake pedal force while an engine of the vehicle is being stopped or being started. The method further comprises automatically stopping an engine of the vehicle when the vehicle is stopped and holding a substantially constant brake line pressure at the wheel brake while the engine is stopped.

The method of FIG. 4 also provides for conserving vacuum, comprising: limiting volume expansion of a brake booster working chamber in response to a speed of a vehicle. The method includes where the speed of the vehicle is less than a threshold speed or zero speed, and where the limiting of volume expansion occurs while an engine of the vehicle is being started via a pushbutton. The method includes where volume expansion of the brake booster working chamber is limited via closing a valve located along a brake line between a master cylinder and a wheel brake, and further comprising limiting air entry into the brake booster working chamber. The method further comprises not constraining volume expansion of the brake booster working chamber in response to the speed of the vehicle exceeding a threshold speed. The method also includes where the volume expansion of the brake booster occurs in response to deflection of a brake booster diaphragm. The method also includes where the speed of the vehicle is zero, and further comprising starting the engine via a pushbutton while a brake pedal is being applied.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. In addition, the terms aspirator or venturi may be substituted for ejector since the devices may perform in a similar manner.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for conserving vacuum for a vehicle, comprising:
   limiting a first brake line pressure increase at a wheel brake in response to a first increase in brake pedal force when the vehicle is stopped;
   limiting a second brake line pressure increase in response to a second increase in brake pedal force when vehicle speed is non-zero and less than a threshold speed; and
   decreasing vacuum in a brake booster working chamber via a valve while limiting the first brake line pressure increase while an engine of the vehicle is operating.

2. The method of claim 1, where the first brake line pressure increase is limited via closing a valve located along a brake line, the brake line extending from a master cylinder to the wheel brake.

3. The method of claim 1, further comprising holding the first brake line pressure increase at a pressure based on road grade.

4. The method of claim 1, further comprising holding the first brake line pressure increase at a pressure calculated based on vehicle mass.

5. The method of claim 1, further comprising limiting the first brake line pressure increase in response to the first increasing brake pedal force while the engine of the vehicle is being stopped or being started.

6. The method of claim 1, further comprising automatically stopping the engine of the vehicle when the vehicle is stopped and holding a substantially constant brake line pressure at the wheel brake while the engine is stopped.

7. A method for conserving vacuum for a vehicle, comprising:
   limiting a first brake line pressure increase at a wheel brake in response to a first increase in brake pedal force when the vehicle is stopped;
   limiting a second brake line pressure increase in response to a second increase in brake pedal force when vehicle speed is non-zero and less than a threshold speed; and
   limiting the first brake line pressure increase in response to a transmission of the vehicle being in park or neutral and limiting air flow into a brake booster working chamber when a brake pedal is applied.

* * * * *